United States Patent

Broyles et al.

[11] Patent Number: 5,978,913
[45] Date of Patent: Nov. 2, 1999

[54] COMPUTER WITH PERIODIC FULL POWER-ON SELF TEST

[75] Inventors: Paul J. Broyles, Cypress; Mark A. Piwonka, Tomball; Cuong V. Nguyen, Houston, all of Tex.

[73] Assignee: Compaq Computer Corporation, Houston, Tex.

[21] Appl. No.: 09/035,462

[22] Filed: Mar. 5, 1998

[51] Int. Cl.⁶ .................................................. G06F 9/445
[52] U.S. Cl. .................................................. 713/2
[58] Field of Search .................................. 713/1, 2

[56] References Cited

U.S. PATENT DOCUMENTS 5,497,497  3/1996  Miller et al. ............................. 713/1
5,860,001  1/1999  Cromer et al. ............................. 713/1

OTHER PUBLICATIONS

PCI BIOS Specification, Revision 2.1, Aug. 26, 1994, pp. 1–24.

Primary Examiner—Thomas M. Heckler
Attorney, Agent, or Firm—Robert Groover

[57] ABSTRACT

A fast boot computer which has three user-selectable modes of performing POST operations. The user can select full POST or quick POST be performed, as in conventional computers. However, he can also select an intermediate mode, wherein the full POST is performed if and only if a given number of days (as programmed by the user) have elapsed since the last full POST operation. This permits users to set their own trade-off between fast boot operation and maximum reliability.

64 Claims, 2 Drawing Sheets

COMPUTER WITH PERIODIC FULL POWER-ON SELF TEST

BACKGROUND AND SUMMARY OF THE INVENTION

The present application relates to startup operations in computer systems.

Background: Computer Start-Up

A computer system normally includes a number of complex hardware components (chips and subsystems). When power is first applied to a computer (or when the user triggers a reset after the system has locked up), the various hardware elements (chips and subsystems) will each have their own internal procedures (reset procedures) to regain a stable and known state. However, at some point (if the hardware is intact), these reset procedures will have ended, and the CPU initiates various important overhead tasks under software control. This phase of operation is generally referred to as "POST" (Power-On-Self-Test). The POST routines provide an extensive check for system integrity. These include, for example, surveying the system configuration, performing sanity checks on system hardware, issuing diagnostic signals (such as sounding beeps through a speaker or turning on LEDs), and permitting the user to branch into an NVRAM configuration program.

An exhaustive POST routine can take a minute or more. This would not be a large amount of time in some contexts, but the delay imposed by POST routines occurs when a user has just started up the computer, and is staring at it while waiting to use it. Thus many users prefer not to wait for a full POST operation. Vendors have therefore introduced models which permit users to select a "quick boot" operation, in which only a minimal set of POST routines is executed.

However, this option forces users to make a choice: more exhaustive testing means a longer delay before the computer boots up. The old method offers only two choices: Full POST for maximum test, and quick POST for minimum boot time (default). Many customers object to this much delay, and therefore vendors offer a machine with a quick POST procedure. Quick POST is desired by most customers, but they may miss detection of certain hardware problems. If the user picks maximum testing, booting takes much longer every time, even though problems are rare and infrequent. Customers are equally concerned with both aspects of POST, but currently have to choose one over the other.

Computer System with Full Power-On-Self-Test on Only Some Boot Operations

The present application discloses a computer system which usually performs a reduced set of Power-On-Self-Test (POST) operations during the boot process, but which also spontaneously launches a more extensive set of POST operations during some reboots. This provides fast reboots most of the time, while also providing a full diagnostic often enough to detect system problems early. Preferably the full set of POST operations is launched whenever a certain number of days has elapsed since the last full set of POST operations, and the number of days between POST operations is itself a user-programmable value.

This provides another system configuration option, intermediate between full POST and quick POST, which provides most of the advantages of both.

The implementation of this invention, in the presently preferred embodiment, involves three components:

1. Non-volatile storage which stores the number of days (1–30) between full self-tests;
2. BIOS calls which read and write the number of days and the chosen option; and
3. System ROM BIOS code to determine the last time a full POST occurred, to compare to the current date and periodic value specified, and then to execute full POST or quick POST accordingly.

Optionally, the full POST operation can be offered as a boot option when due, so that users can temporarily avoid the delay of a full POST when desired. The user can then reboot when leaving the machine, so that the full POST does not impose any user delay.

The disclosed inventions provide a very simple way to optimize power-on-self-testing to best fit the wishes of each buyer. This is a simple and flexible accommodation to user's needs.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Determination of Fast Boot or Full Boot

Figure 1:
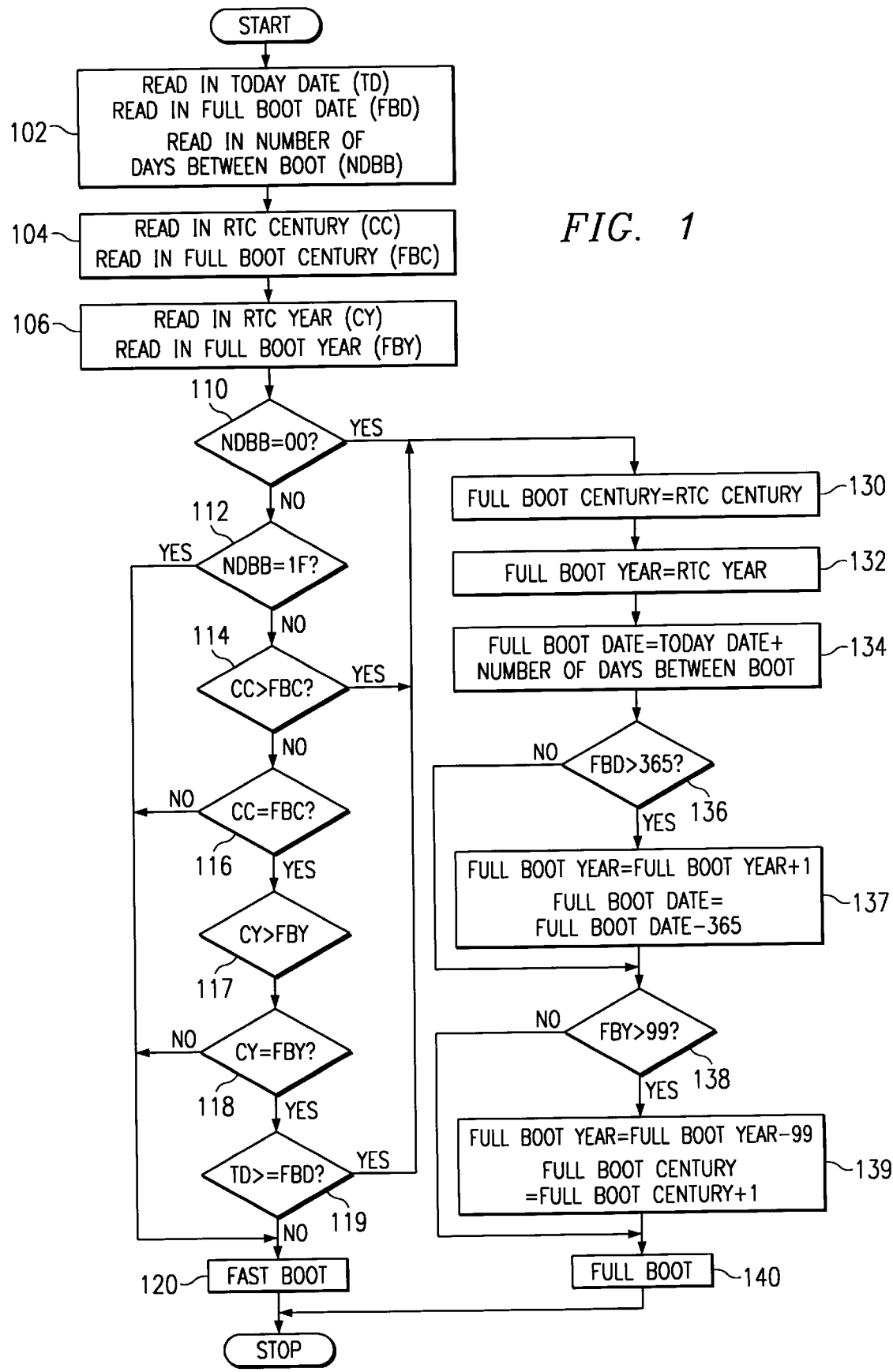
FIG. 1 shows a flowchart of the process of the presently preferred embodiment.

FIG. 1 shows a flowchart of important parts of the process of the presently preferred embodiment.

In Step 102, the processor reads in today's date ("TD") from non-volatile storage, reads in the Full Boot Date ("FBD", i.e. the date when a full boot operation must be performed) from non-volatile storage, and reads in the programmed value for number of days between full boots ("NDBB") from non-volatile storage.

In Step 104, the processor reads in the current century value ("CC") from the real time clock ("RTC"), and the century when a full boot will be due (Full Boot Century "FBC").

In Step 106, the processor reads in the current year ("CY") from RTC, and reads in the year when a full boot will be due (Full Boot Year "FBY").

In Test 110, the processor branches into the full boot sequence if the number of days between full boots is set to zero (NDBB=00). (This programmed value indicates that the machine will always do a full POST when rebooted.)

In Test 112, the processor goes to the Fast Boot operation 120 if the number of days between full boots is set to 31 (NDBB=1F$_H$). (This programmed value indicates that the machine will never launch the full POST automatically.) The Fast Boot process uses only minimal POST, and hence is quicker than a full boot operation with full POST.

In Tests 114 and 116, the processor goes to the full boot sequence if full boot was due in a previous century, and goes to fast boot if full boot is not due in the current century.

Otherwise, in Tests 117 and 118, the processor goes to the full boot sequence if full boot was due in a previous year, and goes to fast boot if full boot is not due in the current year.

Otherwise, in Test 119, the processor goes to fast boot if full boot is not yet due, and otherwise goes to the full boot sequence.

The full boot process begins with Steps 130–139, in which the due date for the next full boot is set ahead by the number of days in the programmed NDBB option. More precisely, in Step 130 the processor sets the Full Boot Century=RTC Century. In Step 132, the processor sets the Full Boot Year=RTC Year. In Step 134, the processor sets the Full Boot Date=Today Date+Number of Days Between Boot. In Test 136 and Step 137, the processor adjusts the year value if the date value has overflowed. In Test 138 and Step 139, the processor adjusts the century value if the year value has overflowed.

These steps are followed by Step 140, which is the conventional Full Boot process with extensive POST.

In an alternative class of embodiments, the present invention permits the POST to be made even more extensive than it might have been otherwise. Even a full POST is a compromise between delay and full testing; since the present application provides ways for users to manage the delay of full testing, the full testing can be made as extensive as desired. Thus the full POST operation can include more extensive memory exercise and/or disk media analysis. This in turn can optionally be used as input to failure prediction algorithms, to provide early warning of imminent failure.

NVRAM Byte Assignments

Below are the NVRAM bytes used, in the presently preferred embodiment, to implement the fast boot for Desktop ROM. Note that the "Fast Boot Bit" in the NVRAM can be referred to by various POST subroutines to truncate their operations.

Figure 3:
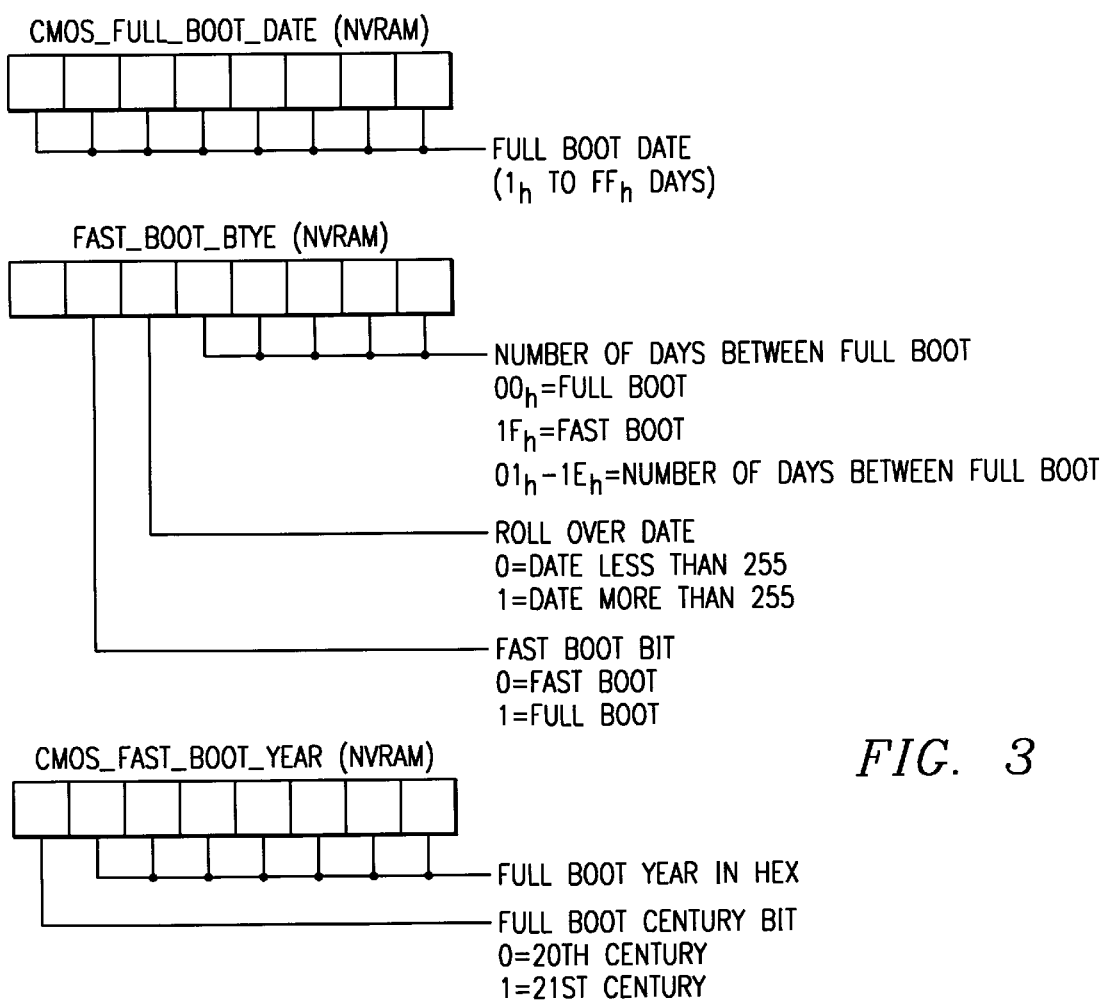
FIG. 3 shows the contents of the NVRAM locations for CMOS_FULL_BOOT_DATE, FAST_BOOT_BYTE, and CMOS_FAST_BOOT_YEAR.

FIG. 3 shows the contents of the NVRAM locations for CMOS_FULL_BOOT_DATE, FAST_BOOT_BYTE, and CMOS_FAST_BOOT_YEAR, as well as descriptions of specific bit settings.

System ROM POST Sequence

The system ROM performs several tasks related to hardware specific items such as programming the chipset registers, configures memory, tests memory, etc.

Following is an example of the sequence of steps in a POST procedure (as shown in the American Megatrends, Inc., webpage in July 1997.)

1. Determine density and type of SIMMs.
2. Shadow system BIOS (System BIOS on the flash is copied to main memory).
3. Initialize interrupt controllers and chip sets.
4. Test CPU registers.
5. Size L2 cache.
6. Test CMOS.
7. Test and initialize CMOS.
8. Test DMA channels.
9. Verify if refresh is running.
10. Test base 64K of memory.
11. Determine total memory size.
12. Initialize keyboard controller.
13. Detect presence of external Video controllers.
14. Configure PCI video, set monitor refresh rates and size video memory.
15. Display Banner.
16. Reset Keyboard.
17. Test memory above 64K, base and extended (memory count).
18. Flush and enable L2 cache. (A bad cache card should not affect system POST until this stage.)
19. Initialize serial and parallel port controllers.
20. Initialize floppy controller and seek for floppy drives specified in CMOS.
21. Reset Mouse.
22. Initialize hard disk subsystem. Determine type and size of IDE drives.
23. Run Plug and Play code.
24. Beep signifying end of POST.
25. Boot to OS on bootable media.

Further details of the system context, and of options for implementation, may be found in the books from MindShare, Inc., entitled ISA SYSTEM ARCHITECTURE (3.ed.), 80486 SYSTEM ARCHITECTURE (3.ed.), PENTIUM PROCESSOR SYSTEM ARCHITECTURE (2.ed.), PCI SYSTEM ARCHITECTURE (3.ed. 1995), and PENTIUM PRO PROCESSOR SYSTEM ARCHITECTURE (1.ed. 1997, 2.ed. 1997), all of which are hereby incorporated by reference, and in the PENTIUM PROCESSOR FAMILY DEVELOPER'S MANUAL 1997, the INTEL ARCHITECTURE OPTIMIZATIONS MANUAL, the INTEL ARCHITECTURE SOFTWARE DEVELOPER'S MANUAL, the PERIPHERAL COMPONENTS 1996 databook, the PENTIUM PRO PROCESSOR BIOS WRITER'S GUIDE (version 2.0, 1996), and the PENTIUM PRO FAMILY DEVELOPER'S MANUALS from Intel, all of which are hereby incorporated by reference.

Sample Hardware Implementation

Figure 2:
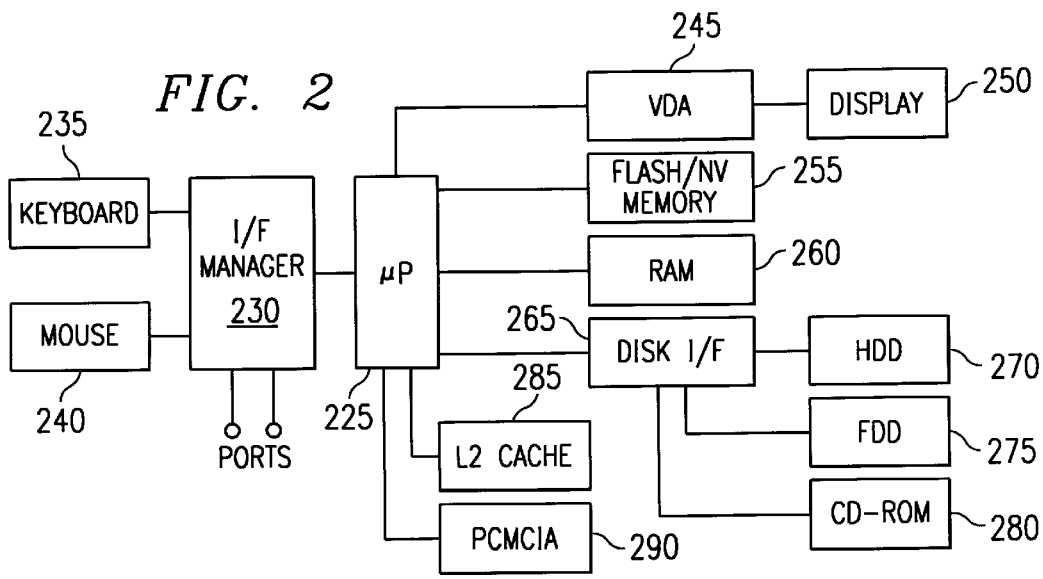
FIG. 2 shows a block diagram of a computer system in which the method of FIG. 1 can be implemented.

FIG. 2 shows a block diagram of a computer system in which the method of FIG. 1 can be implemented. The computer system includes in this example:

- user input devices (e.g. keyboard 235 and mouse 240);
- at least one microprocessor 225 which is operatively connected to receive inputs from said input device, through an interface manager chip 230 (which also provides an interface to the various ports);
- a memory (e.g. flash or non-volatile memory 255 and RAM 260), which is accessible by the microprocessor;
- a data output device (e.g. display 250 and video display adapter card 245) which is connected to output data generated by the microprocessor 225; and
- a magnetic disk drive 270 which is read-write accessible, through an interface unit 265, by the microprocessor 225.

Optionally, of course, many other components can be included, and this configuration is not definitive by any means. For example, the computer may also include a CD-ROM drive 280 and floppy disk drive ("FDD") 275 which may interface to the disk interface controller 265. Additionally, L2 cache 285 may be added to speed data access from the disk drives to the microprocessor, and a PCMCIA 290 slot accommodates peripheral enhancements.

In a typical desktop system (for example, with a 200 MHz Pentium Pro processor), the time to run POST routines was found to be about 25–30 seconds (depending on the amount of installed memory) during a normal boot, as compared to about 12–16 seconds during a fast boot operation. Additional time will be required if SCSI adapters are present, but this is not affected by the choice of full or minimal system POST operations.

Most of the additional time in the full POST is consumed by memory testing. For example, in the presently preferred embodiment, the quick boot operation tests only the first 1M of memory, while the full boot operation tests all RAM.

Even after the full POST is launched, the user is not captive, in the presently preferred embodiment: preferably he is allowed to terminate the memory testing simply by hitting the Escape key.

Alternative Embodiment: Truncated Peripheral Testing

The use of abbreviated memory testing, in the presently preferred embodiment, is only one way to abbreviate the POST process. In this class of embodiments, the abbreviated POST process also shortens or omits the testing of the peripheral devices testing (including floppy drives, hard disk drives, and CD-ROM drives.

Alternative Embodiment: Forced POST Test Every Nth Boot

In an alternative class of innovative embodiments, the full POST test is launched at every nth boot operation, instead of after every m number of days. (In yet another alternative, the full POST test can be automatically launched according to a formula which takes account of both the number of days and the number of boot operations.)

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, it should be noted that the precise sequence of POST operations, and even the exact choice of tests skipped, is NOT critical: instead the present application provides a novel way to automatically launch two different levels of POST. The question of what steps to include or exclude from the two different levels of POST is less important than the automatic control of multiple POST levels.

Optionally, control of the full boot option can be reserved for system administrator.

In a further contemplated class of alternatives, launch of the full boot process can also be made dependent on the time of day. Thus, for example, when a full boot is due, a user warning can be made to appear, but the full POST process can be reserved for the next boot operation after 10 am. In this embodiment the user could simply launch a reboot when he departs for lunch, and thus will not have to wait for the full POST operation.

In alternative embodiments, three or more levels of POST can be automatically selected by an extension of the procedure described above. For example, in addition to the minimal POST and full POST described above, an extended POST, with really extensive self-diagnostics, can optionally be launched at longer intervals (e.g. every three months). The extended POST could include more extensive hardware tests for failure analysis, and could even include routines for reporting the results of the testing. Of course, the user can be given the option to delay or cancel the extended POST.

It should also be noted that the disclosed innovative ideas are not limited only to Windows, DOS or UNIX systems, but can also be implemented in other operating systems.

It should also be noted that the disclosed innovative ideas are not limited only to systems using ISA, EISA, and/or PCI busses, but can also be implemented in systems using other bus architectures.

It should also be noted that the disclosed innovative ideas are not limited only to systems based on an x86-compatible microprocessor, but can also be implemented in systems using 680x0, RISC, or other processor architectures.

It should also be noted that the disclosed innovative ideas are not by any means limited to systems using a single-processor CPU, but can also be implemented in computers using multiprocessor architectures.

It should also be noted that the disclosed innovative ideas are not by any means limited to single-user desktop systems, but are also applicable to network servers, mainframe transaction processing systems, terminals, engineering workstations, and portable computers.

What is claimed is:

1. A method of initializing a computer after a system hardware reset, comprising the alternative steps of:
    (a.) after some system resets, initiating a first set of Power-On-Self-Test operations; and
    (b.) after other system resets, initiating a second set of Power-On-Self-Test operations which takes more time than said first set of Power-On-Self-Test operation;
    wherein said step (b.) is selected intermittently and automatically, without active user intervention, based on a programmed test.

2. The method of claim 1, wherein said computer includes random-access memory, and said first set of operations exercises only part of said random-access memory, and said second set of operations exercises all of said random-access memory.

3. The method of claim 1, wherein said first set of operations exercises only some ones of a plurality of attached peripheral devices, and said second set of operations exercises all of said peripheral devices.

4. The method of claim 1, wherein said programmed test is at least partially user specified.

5. The method of claim 1, wherein said second set of operations can be interrupted by user input.

6. The method of claim 1, wherein said second set of operations can be interrupted by user input, and if said second set of operations is interrupted by user input then said first set of operations is automatically completed.

7. The method of claim 1, wherein said programmed test checks the number of days since step (b.) was last performed.

8. The method of claim 1, wherein said step (a.) is performed whenever said step (b.) is not performed.

9. A method of initializing a computer after a system hardware reset, comprising the steps of alternatively:
    (a.) after some system resets, initiating a first set of Power-On-Self-Test operations; and (b.) after other system resets, initiating a second set of Power-On-Self-Test operations which takes more time than said first set of Power-On-Self-Test operation;

wherein said step (b.) is selected intermittently and automatically, without active user intervention, whenever a minimum number of days has elapsed since the last execution of said step (b.).

10. The method of claim 9, wherein said first set of operations exercises only some ones of a plurality of attached peripheral devices, and said second set of operations exercises all of said peripheral devices.

11. The method of claim 9, wherein said computer includes random-access memory, and said first set of operations exercises only part of said random-access memory, and said second set of operations exercises all of said random-access memory.

12. The method of claim 9, wherein said second set of operations can be interrupted by user input.

13. The method of claim 9, wherein said second set of operations can be interrupted by user input, and if said second set of operations is interrupted by user input then said first set of operations is automatically completed.

14. The method of claim 9, wherein outputs from said second set of Power-On-Self-Test operations are provided as inputs to a failure production algorithm.

15. The method of claim 9, wherein outputs from said second set of Power-On-Self-Test operations, but not from said first set of Power-On-Self-Test operations, are provided as inputs to a failure production algorithm.

16. The method of claim 9, wherein said minimum number of days is at least partially user specified.

17. The method of claim 9, wherein said step (a.) is performed whenever said step (b.) is not performed.

18. A method of initializing a computer after a system hardware reset, comprising:

in a first user-selected mode, the steps of alternatively:
(a.) after some system resets, initiating a first set of Power-On-Self-Test operations; and
(b.) after other system resets, initiating a second set of Power-On-Self-Test operations which takes more time than said first set of Power-On-Self-Test operation;
wherein said step (b.) is selected intermittently and automatically, without active user intervention, based on a programmed test; and in a second user-selected mode, always performing said second set of Power-On-Self-Test operations.

19. The method of claim 18, wherein said first set of operations exercises only some ones of a plurality of attached peripheral devices, and said second set of operations exercises all of said peripheral devices.

20. The method of claim 18, wherein said computer includes random-access memory, and said first set of operations exercises only part of said random-access memory, and said second set of operations exercises all of said random-access memory.

21. The method of claim 18, wherein said second set of operations can be interrupted by user input.

22. The method of claim 18, wherein said second set of operations can be interrupted by user input, and if said second set of operations is interrupted by user input then said first set of operations is automatically completed.

23. The method of claim 18, wherein outputs from said second set of Power-On-Self-Test operations are provided as inputs to a failure production algorithm.

24. The method of claim 18, wherein outputs from said second set of Power-On-Self-Test operations, but not from said first set of Power-On-Self-Test operations, are provided as inputs to a failure production algorithm.

25. The method of claim 18, wherein said programmed test is at least partially user specified.

26. The method of claim 18, wherein said programmed test checks the number of days since step (b.) was last performed.

27. The method of claim 18, wherein said step (a.) is performed whenever said step (b.) is not performed.

28. A method of initializing a computer after a system hardware reset, comprising:

in a first mode, the steps of alternatively:
(a.) after some system resets, initiating a first set of Power-On-Self-Test operations; and
(b.) after other system resets, initiating a second set of Power-On-Self-Test operations which includes more extensive testing, and takes more time, than said first set of Power-On-Self-Test operation;
wherein said step (b.) is selected intermittently and automatically, without active user intervention, based on a programmed test;

in a second mode, always performing said second set of Power-On-Self-Test operations after a system reset; and in a third mode, always performing said first set of Power-On-Self-Test operations after a system reset.

29. The method of claim 28, wherein said first set of operations exercises only some ones of a plurality of attached peripheral devices, and said second set of operations exercises all of said peripheral devices.

30. The method of claim 28, wherein said computer includes random-access memory, and said first set of operations exercises only part of said random-access memory, and said second set of operations exercises all of said random-access memory.

31. The method of claim 28, wherein said second set of operations can be interrupted by user input.

32. The method of claim 28, wherein said second set of operations can be interrupted by user input, and if said second set of operations is interrupted by user input then said first set of operations is automatically completed.

33. The method of claim 28, wherein outputs from said second set of Power-On-Self-Test operations are provided as inputs to a failure production algorithm.

34. The method of claim 28, wherein outputs from said second set of Power-On-Self-Test operations, but not from said first set of Power-On-Self-Test operations, are provided as inputs to a failure production algorithm.

35. The method of claim 28, wherein said programmed test is at least partially user specified.

36. The method of claim 28, wherein said programmed test checks the number of days since step (b.) was last performed.

37. The method of claim 28, wherein said step (a.) is performed whenever said step (b.) is not performed.

38. A computer system, comprising:

at least one input device and at least one output device; and a main system module which does not include said input and output devices, and which includes therein: at least one processor which is operatively connected to detect inputs from said input device and to send data to said output device, and random-access memory which is connected to be read/write accessible by said microprocessor;

wherein, when said system emerges from a reset condition, a programmed test automatically determines whether to run a first set or a second set of Power-On-Self-Test operations, said second set of operations being more extensive than said first set.

39. The system of claim 38, wherein said computer includes random-access memory, and said first set of operations exercises only part of said random-access memory, and said second set of operations exercises all of said random-access memory.

40. The system of claim 38, wherein said first set of operations exercises only some ones of a plurality of attached peripheral devices, and said second set of operations exercises all of said peripheral devices.

41. The system of claim 38, wherein said programmed test is at least partially user specified.

42. The system of claim 38, wherein said second set of operations can be interrupted by user input.

43. The system of claim 38, wherein said second set of operations can be interrupted by user input, and if said second set of operations is interrupted by user input then said first set of operations is automatically completed.

44. The system of claim 38, wherein said programmed test checks the number of days since step (b.) was last performed.

45. The system of claim 38, wherein said step (a.) is performed whenever said step (b.) is not performed.

46. A computer system, comprising:

at least one input device and at least one output device; and a main system module which does not include said input and output devices, and which includes therein: at least one processor which is operatively connected to detect inputs from said input device and to send data to said output device, and random-access memory which is connected to be read/write accessible by said microprocessor;

wherein, when said system emerges from a reset condition, a first set of Power-On-Self-Test operations is normally executed;

except that intermittently a second set of Power-On-Self-Test operations, which is more extensive than said first set, is executed, depending on the duration since said second set was last previously executed.

47. The system of claim 46, wherein said first set of operations exercises only some ones of a plurality of attached peripheral devices, and said second set of operations exercises all of said peripheral devices.

48. The system of claim 46, wherein said first set of operations exercises only part of said random-access memory, and said second set of operations exercises all of said random-access memory.

49. The system of claim 46, wherein said second set of operations can be interrupted by user input.

50. The system of claim 46, wherein said second set of operations can be interrupted by user input, and if said second set of operations is interrupted by user input then said first set of operations is automatically completed.

51. The system of claim 46, wherein outputs from said first set of Power-On-Self-Test operations are provided as inputs to a failure production algorithm.

52. The system of claim 46, wherein outputs from said first set of Power-On-Self-Test operations, but not from said second set of Power-On-Self-Test operations, are provided as inputs to a failure production algorithm.

53. The system of claim 46, wherein said minimum number of days is at least partially user specified.

54. The system of claim 46, wherein said step (a.) is performed whenever said step (b.) is not performed.

55. A computer system, comprising:

at least one input device and at least one output device; and a main system module which does not include said input and output devices, and which includes therein: at least one processor which is operatively connected to detect inputs from said input device and to send data to said output device, and random-access memory which is connected to be read/write accessible by said microprocessor;

wherein, when said system emerges from a reset condition, if the system has been put into a first user-selected mode, a first set of Power-On-Self-Test operations is normally executed;

except that intermittently a second set of Power-On-Self-Test operations, which is more extensive than said first set, is executed, as determined without active user intervention by an automatic programmed test; and if the system has been put into a second user-selected mode, only said first set of Power-On-Self-Test operations is automatically executed.

56. The system of claim 55, wherein said first set of operations exercises only some ones of a plurality of attached peripheral devices, and said second set of operations exercises all of said peripheral devices.

57. The system of claim 55, wherein said computer includes random-access memory, and said first set of operations exercises only part of said random-access memory, and said second set of operations exercises all of said random-access memory.

58. The system of claim 55, wherein said second set of operations can be interrupted by user input.

59. The system of claim 55, wherein said second set of operations can be interrupted by user input, and if said second set of operations is interrupted by user input then said first set of operations is automatically completed.

60. The system of claim 55, wherein outputs from said first set of Power-On-Self-Test operations are provided as inputs to a failure production algorithm.

61. The system of claim 55, wherein outputs from said first set of Power-On-Self-Test operations, but not from said second set of Power-On-Self-Test operations, are provided as inputs to a failure production algorithm.

62. The system of claim 55, wherein said programmed test is at least partially user specified.

63. The system of claim 55, wherein said programmed test checks the number of days since step (b.) was last performed.

64. The system of claim 55, wherein said step (a.) is performed whenever said step (b.) is not performed.

* * * * *